United States Patent [19]
Yazaki et al.

[11] 4,126,872
[45] * Nov. 21, 1978

[54] APERTURE SETTING DEVICE FOR CAMERA

[75] Inventors: Mutsunobu Yazaki; Takashi Uchiyama; Mutsuhide Matsuda, all of Yokohama; Tetsuya Taguchi, Kawasaki; Yukio Mashimo, Tokyo, all of Japan

[73] Assignee: Canon Kabushiki Kaisha, Tokyo, Japan

[ * ] Notice: The portion of the term of this patent subsequent to Jun. 14, 1994, has been disclaimed.

[21] Appl. No.: 739,989

[22] Filed: Nov. 8, 1976

Related U.S. Application Data

[63] Continuation of Ser. No. 576,441, May 12, 1975, Pat. No. 4,030,108, which is a continuation of Ser. No. 399,480, Sep. 21, 1973, abandoned.

[30] Foreign Application Priority Data

Sep. 25, 1972 [JP] Japan ................................. 47-95997
Sep. 26, 1972 [JP] Japan ................................. 47-96474

[51] Int. Cl.² ............................................... G03B 7/16
[52] U.S. Cl. ...................................... 354/33; 354/149; 354/272

[58] Field of Search .................... 354/27, 28, 32, 33, 354/36, 37, 38, 40, 41, 47, 145, 149, 270, 272, 34, 35, 139

[56] References Cited

U.S. PATENT DOCUMENTS

| | | | |
|---|---|---|---|
| 2,993,422 | 7/1961 | Rentschler | 354/36 |
| 3,273,483 | 9/1966 | Weidner et al. | 354/149 X |
| 3,512,463 | 5/1970 | Kiper | 354/38 |
| 3,535,989 | 10/1970 | Kitai | 354/32 |
| 3,554,104 | 1/1971 | Winkler et al. | 354/38 X |
| 3,638,543 | 2/1972 | Kondo | 354/35 |
| 3,675,547 | 7/1972 | Uchiyama et al. | 354/35 |
| 3,699,859 | 10/1972 | Akiyama | 354/33 |
| 3,714,872 | 2/1973 | Mashimo et al. | 354/33 |
| 3,886,568 | 5/1975 | Yazaki et al. | 354/27 |
| 4,030,108 | 6/1977 | Yazaki et al. | 354/27 |

*Primary Examiner*—Michael L. Gellner
*Attorney, Agent, or Firm*—Toren, McGeady and Stanger

[57] ABSTRACT

In the disclosed arrangement, an energy storage device such as a capacitor is discharged through a flash lamp. A sensing device produces a signal when the storage voltage is sufficient to fire the lamp. A switchover device normally permits the shutter and exposure aperture to be set for daylight operation, but automatically responds to the signal to switch the shutter speed and the exposure aperture to suitable values for flash operation.

5 Claims, 9 Drawing Figures

APERTURE SETTING DEVICE FOR CAMERA

This is a continuation of Application Ser. No. 576,441 filed May 12, 1975, now U.S. Pat. No. 4,030,108, which Application is in turn a continuation of Application Ser. No. 399,480 filed Sept. 21, 1973, now abandoned.

BACKGROUND OF THE INVENTION

1. Field of the Invention

The present invention relates to an aperture setting device for camera, particularly to a device with which a proper aperture setting can be obtained not only for general photographing with automatic exposure (E.E. photography) but also for flash photograph under flashlight.

In a conventional electronic shutter camera with aperture priority the switching ring for setting the aperture is set for a predetermined aperture, the aperture ring of the photographing lens in direct connection with the aperture setting ring is driven so as to determine the aperture, while the light quantity reaching the light receiving element is adjusted in such a manner that the switching circuit is operated by means of a time constant circuit consisting of the light receiving element and a condensor so as to obtain a shutter speed.

If a flash is used with such a camera, the value of aperture has to be calculated in advance according to the guide member (hereinafter called GNO) of the flash device and the distance to the object in order that thus obtained value of aperture is set on the camera. This is very inconvenient.

SUMMARY OF THE PRESENT INVENTION

One of the objects of the present invention is to offer a new aperture setting device which does not have the above mentioned weak point of the conventional device and with which a proper aperture setting can be obtained by setting the aperture conventionally in daylight and by simply switching the aperture setting ring to the flash range.

Another object of the present invention is to offer an aperture setting device with which the aperture setting can be carried out according to certained determined informations such as of photographing distance and so on, the photographing under flashlight being automatically switched in case the flash device is ready to operate.

Further object of the present invention will be clear from the following detailed explanation about the present invention referring to the attached drawings.

DESCRIPTION OF THE PRESENT EMBODIMENT

Figure 1:
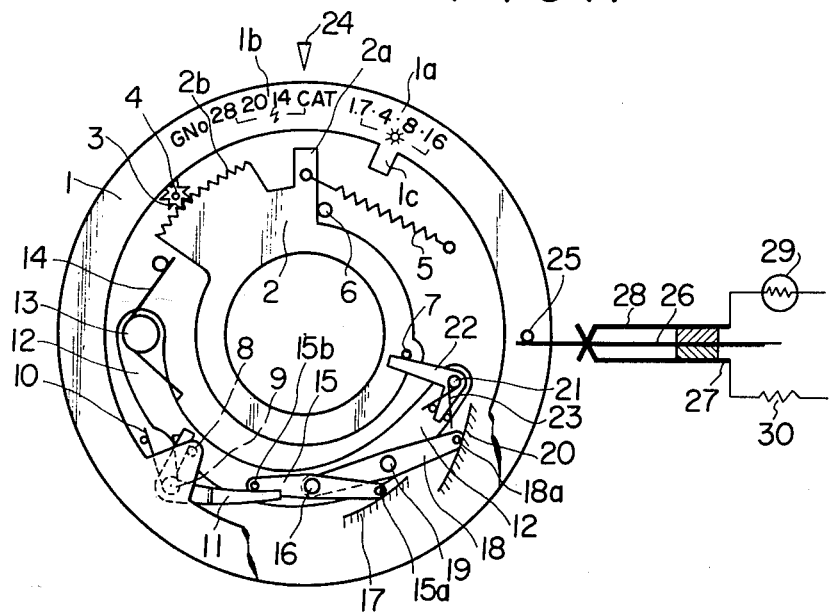
FIG. 1 shows the aperture setting device to explain the operation at the time of photographing under flashlight.

FIG. 1 shows the state in which the aperture of the objective lens is set according to the focusing distance by setting the aperture setting ring in the special flash range marked CAT.

In the drawing, an aperture setting ring 1 with an abutment 1c switches the operation of the camera from a daylight range 1a into a flash range 1b.

An aperture ring 2 serves as an intermediate or middle ring for determining the effective aperture of the objective lens. An arm 2a on the ring 2 is engageable with the abutment 1c of the aperture setting ring 1. On the ring 2, a sector gear or gear part 2b engages a spur gear 3 for conveying objective aperture data to an aperture member of a light receiving element. A rotating shaft 4 on the gear 3 is mounted on a film sensitivity indicating ring 32 which is explained in more detail below. A spring 5 urges the intermediate ring 2 in the clockwise direction.

The ring 2 contacts a stopper pin 6 when the lens aperture is fully opened. A pin 7 on the ring 2 drives the ring 2 to establish the lens aperture and is in engagement with a lever 22 during flash operation. A pin 8 fixed on the ring 1 serves to operate a mechanism which drives the ring 2 on the basis of the guide member data during flash operation. A rotating shaft 9 of a GNO lever 11 conveys the guide number to the mechanism to drive the aperture ring during flash operation. The lever 11 engages the pin 8. A spring 10 urges the lever 11 clockwise. Forming part of the aperture driving mechanism is a member 12 composed of a circular lever rotatable around a shaft 13 which is fixed to the camera body. A spring 14 urges the member 12 clockwise.

Numeral 15 represents a first middle lever for adding film sensitivity information to the guide number data, 15a is a pin for detecting film sensitivity information and 15b a pin for detecting the guide number information. Each pin is provided on the first middle lever. Numeral 16 represents the rotating shaft of the first middle lever 15 and fixed on the second middle lever 18 for detecting the information of distance. Numeral 17 represents a cam for the information of the sensativity of film and provided on the switching over ring 32 of the sensativity of film, which is explained in detail later. Member 19 is the rotating shaft of the second middle lever 18 and provided on the lever 12 for driving aperture. Member 20 is the cam for the information of distance and provided on the distance adjusting ring not shown in the drawing, being pressed against a pin 18a provided on the second middle lever 18. The third middle lever 22 is, around the rotating shaft as center, pressed against a certain determined position, serving to convey the displacement of the aperture driving lever 12 to the ring 2. Member 24 is the fixed index for the aperture setting ring 1. Member 25 is a pin fixed on the aperture setting ring 1, being insulated, and serves to connect the light receiving element 29 and the time constant resistance 30 selectively with the switching circuit according to the photographing condition, being in engagement with contacts 26, 27 and 28.

Figure 2:
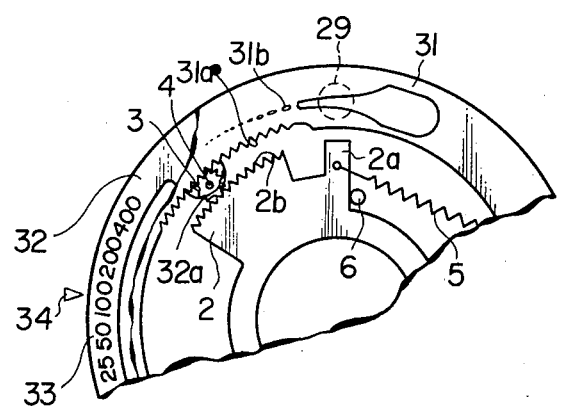
FIG. 2 shows the switching over ring for the sensibility of film.

FIG. 2 shows the construction of the device shown in FIG. 1, in detail.

In FIG. 2, 31 represents the aperture plate for adjusting the light quantity reaching the light receiving element 29 and presents the gear part 31a engaging with the gear 3 and the opening 31b composing the aperture part. Member 32 is the switching over ring for the sensibility of film and presents an abutment 32a for fixing the pin 4. Member 33 is the scale for the film sensibility, being provided on the above mentioned switching over ring for the sensibility of film. Member 34 is the index for the scale for the sensibility of film, being provided on the fixing part of the camera.

Figure 3:
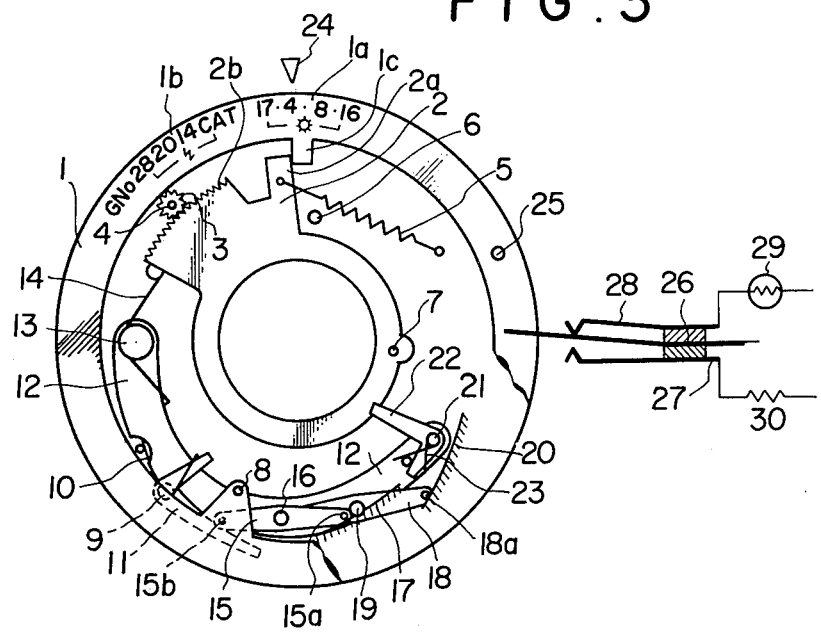
FIG. 3 shows the aperture setting device to explain the operation at the time of photographing under daylight.
Figure 4:
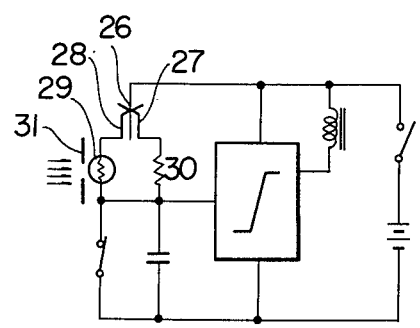
FIG. 4 shows a block circuit diagram for the electric shutter to be applied for the aperture setting device shown in FIGS. 1 to 3.

Below the operation is explained. When photographing during daylight the aperture setting ring 1 is set as is shown in FIG. 3 to an aperture value in the daylight range 19 (for example F4) on the index 24. Thus the abutment 1c engages the arm 2a, the ring 2 is rotated clockwise against the strength of the spring 5 and the aperture blade not shown in the drawing of the photographing lens is set as F4. At the same time the movement of the ring 2 induces the rotation of the aperture plate 31 of the light receiving element 29 by means of the gear part 2b and the gear 3 on the index 24 to a certain determined aperture is set, the value set. When photographing with flash the shutter of the camera is released in this state, the exposure according to the brightness of the object is obtained.

In case of the photographing under the flashlight the aperture setting ring 1 is set in such a manner that the flash range 1b (for example a special range marked CAT in FIG. 1). Rotation of the ring 1, disengages the abutment 1c from the arm 2a, and engages the pin 8 on the aperture setting ring 1 with the GNO lever 11. Thus the GNO lever is rotated counter clockwise so that guide number information is set on the lever 11. When the film sensitivity ring 32 is rotated, the cam 17 is moved and the displacement is detected with he pin 15a. The position of the rotating shaft of the first middle lever is now rotated around the pin 15b. Thus the first middle lever which acts 15 is rotated around the GNO lever as a support point, so that the rotation of the lever 15 assumes a value corresponding to the value of the GNO and that of the film sensitivity. On the other hand the position of the first middle lever 15 is decided, when the shaft 16 mounted on the one end of the second middle lever 18 assumes a certain determined position. Setting the distance to the object now rotates the distance cam 20 mounted on the distance adjusting ring (now shown in the drawing). Thus the detecting pin 18a rotates the second middle lever 18 about the detecting pin 16. Because in this case the rotating shaft 19 of the second lever is fixed on the driving lever 12, together with the rotation of the rotating shaft 19 the driving lever 12 is also rotated around the shaft 13 as center in such a manner that by means of the third middle lever 22 and the pin 7 the aperture driving ring 2 is rotated up to the position of the value of apperture corresponding to the distance of the object. On the other hand by means of the gear part 2b on the ring the aperture of the photographing lens and the aperture 31b of the light receiving element corresponding to the value of the sensativity of film are set as in case of the photographing under daylight.

During flash operation the value of the resistance of the light receiving element 29 is greater than that of the parallel resistance 30 (because the object is large), the shutter speed is set at a certain value (for example 1/30 sec.) by means of the parallel resistance 30.

In case the object is dark while the background is bright (in case of the so called counter-light) the value of the resistance 29 of the light receiving element is smaller than that of the parallel resistance 30, a shutter speed can be obtained in such a manner that a proper exposure can be obtained for the background. The shutter speed in this case is smaller than 1/30 sec., while in the special range marked with CAT the speed light is used as flashlight, no influence is given to the photographing under flashlight. Further the exposure for the object is determined according to value of the aperture determined with the distance, so that the proper exposure is naturally obtained.

As mentioned above when operating during daylight the light receiving element 29 and the resistance 30 act in parallel with each other so that a proper exposure for the object can be obtained according to the GNO of a certain determined flashlight, the film sensitivity and the distance. Thus a proper exposure for the background can be obtained by means of the shutter speed determined by the light receiving element 29 so that both exposures become proper.

In case of other devices than a certain determined flashing device the switching over ring 1 is rotated further so as to set a certain value of GNO (equivalent to ASA 100), in such a manner that the photographing under flashlight can be carried out with the same method as mentioned above with other device. Hereby it is necessary to separate the light receiving element 29 from the time constant circuit, leaving the parallel resistance 30 only, because there is a possibility to use a device with longer time of the flashlight. (When it is disregarded to use a device with longer time of the flashlight, it is not necessary to separate the light receiving element 29 whereby the synchronized photographing is possible with any device.)

Further because in case of the photographing under flashlight outside of the aperture range of the photographing lens (F 1.7-16 in FIG. 1) a proper exposure can not be obtained, an overload on the third middle lever can be absorbed by the spring 23, outside of the range for functional engagement at the time of the distance adjusting in case the rotating range of the ring 2 is to be controlled, or the third middle lever can be specially shaped in such a manner it does not interfere with the pin 7 outside of the range for functional engagement.

So far the case is explained, when in case of the photographing under flashlight the aperture value is manually set according to the photographing informations such as the information of distance, GNO and so on, while below according to an embodiment in FIGS. 5-9 the case is explained, when the aperture value is automatically set.

Figure 5:
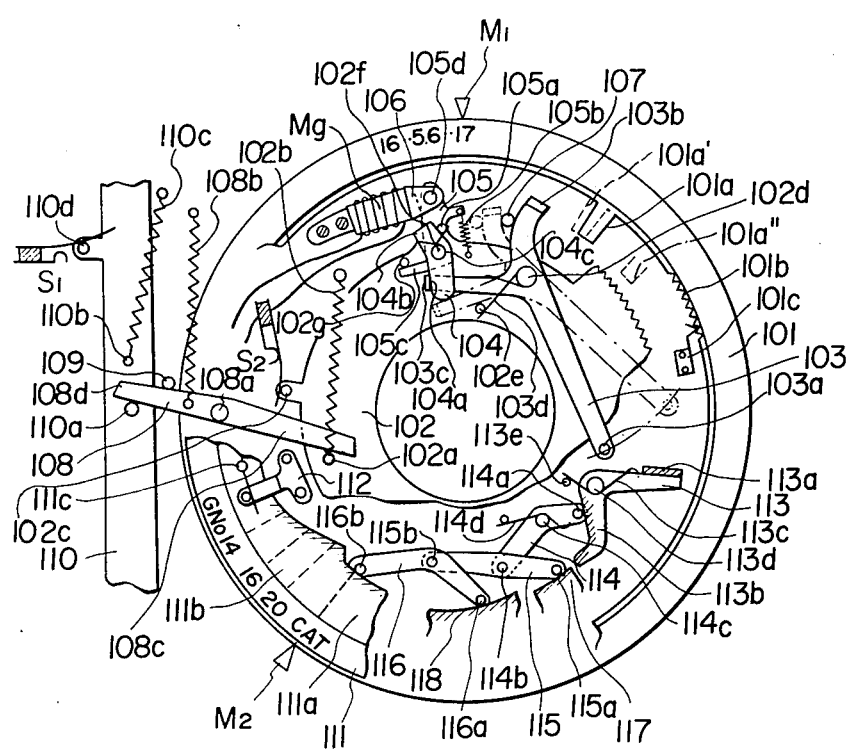
FIG. 5 shows another concrete embodiment to explain the operation.
Figure 6:
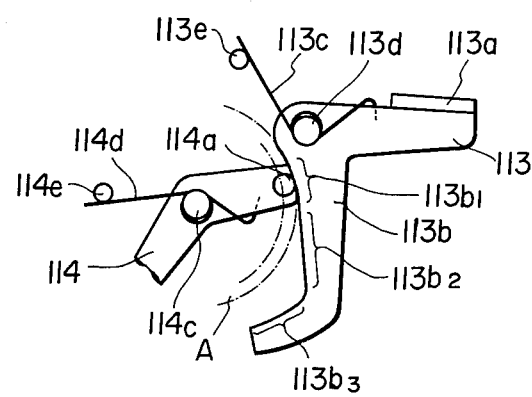
FIG. 6 shows an important part of the device shown in FIG. 5.

FIG. 5 shows the principal portions of a device in which the aperture value is automatically set. Here an aperture setting ring 101 sets a given aperture scale relative to a fixed index $M_1$. An abutment 101a of the ring 101 can be set at 101a' at the largest aperture setting and at 101a'' at the smallest aperture setting. An uneven or ridged portion engages a clip with a fixed clip spring 101c. An aperture ring 102 is always urged clockwise by means of a pin 102a and a spring 102b mounted on the ring. On 102 are further mounted the insulated pin 102c, the rotating shaft 102d of the three armed lever 103, the pin 102e, the claw 104, the rotating shaft 102f of the lever 105 and the pin 102g. Three armed lever 103 is provided with the pin 103a, the rising parts 103b and on 103c, being urged anticlockwise by means of the spring 103d and the pin 102e. At the end of the claw 104 there are a claw part 104 in engagement with 103c and the other foot 104b, whereby by means of the spring 104c and the lever 105 of the pin 105a, 104 and 105 are atracting each other. The lever 105 is urged clockwise by the spring 105b, whereby the foot 105c lies on the pin 102g. An iron piece 106 is rotatably mounted on 105 through the pin 105d of 105, whereby the iron piece 106 is pressed against a usually fixed magnet Mg. Member 107 is a fixed pin to make the three armed lever 103 return. Element 108 is the middle lever, which is urged clockwise rotatably around the shaft 108a as center, whereby the one foot is pressed against the pin 102a, while the other foot is pressed against the fixed pin 109 and the pin 110a of the release lever 110. On the release lever 110 a pin 110b is further mounted and pulled upwards by the spring 110c. 110d is an insulated pin. $S_1$ and $S_2$ are switches to be operated with the insulated pin 110d and the insulated pin 102c respectively.

Member 111 is the guide number setting ring, whose scale is, according to the guide number of the flash device to be used, set on the fixed index $M_2$. CAT is the setting position in case the flash device exclusive for the aperture setting device is used, whereby on the scale of the guide number the guide number by ASA = 100 is to be set as mentioned above. 111 consists of the cam parts 111a and 111b and presents a hole for click to hold 111 at a certain determined position by means of the click plate spring. The stop lever 113 presents a rising part 113a and the cam part 113b and is urged clockwise rotatably around the fixed rotating shaft 113d as center by means of the fixed pin 113e and the spring 113c. The lever 114 presents a pin 114a and the rotating shaft 115b of the lever 115 and is urged anticlockwise rotatably around the fixed rotating shaft 114c as center by means of the spring 114d and the fixed pin 114e. The lever 115 is rotatably supported by the lever 114, whereby the pin 115a is pressed against the distance cam (in functional engagement with the distance ring) by means of the spring. The lever 115a presents the rotating shaft 115b of the lever 116 at the other end. The pin of the lever 116 rotatably supported by the lever 115 is pressed against the ASA cam 118, while the pin 116 is pressed against the cam part 111a or 111b of 111 respectively by means of the spring 114d.

Below the operation of the aperture setting device composed as mentioned above according to the present invention is explained.

In case of photographing under daylight no current flows through the magnet Mg as mentioned later. When the release lever 110 is pushed down the switch $S_1$ is closed and soon the foot 108d of the middle lever 108c is pushed down by means of the pin 110b, while the other foot 108c is moved upwards and following it the aperture ring 102 starts to rotate clockwise pressing against the lever 108 with the pin 102a. Because no current flows through the magnet Mg the iron piece 106 is not atracted by the magnet, whereby the lever 105, the iron piece 106 and 80 on are rotated clockwise, being seated on the aperture ring, their relative position thereby being kept as shown in the drawing. When the release lever is further pushed down, the rising part 103b of the three armed lever 103 is displaced according to the set position of the aperture setting ring 101, and lies against the abutment 101a held by click. This holds the aperture ring 102 at this position in such a manner that the aperture is adjusted to the aperture value set on the aperture setting ring. The three armed lever 103 does not rotate counterclockwise around pivot 102d when, 103b hits 101a because the part 103c is held by the claw 104. Further there is no rising part 113a of the stoplever 113 in the course of movement of the pin 103a, the aperture ring can never be stopped according to the distance and so on. As mentioned above the aperture in case of photographing under daylight is manually set as is the case with the embodiment of the present invention shown in FIGS. 1 to 3.

For flash operation, when everything is ready, a current flows through the magnet Mg. When the release lever 110 is pushed down the switch $S_1$ is at first closed and the aperture ring 102 starts to rotate clockwise. The current through the magnet Mg causes the iron piece 106 to be pulled in such a manner that a self rotating counterclockwise is applied to the claw 104, whose rotating shaft *102f is moved to the right by the pin 105a* of the lever. As the result 104 with 103 are disengaged the rotation of the aperture ring 102 now establishes the relation between the fixed pin 107 and the three armed lever 103 this occurs in such a manner that lever 103 is stopped by means of the pin 104 in the position shown in the drawing by the dot-dash line. As soon as the engagement of 104a and 103c ends, the switch $S_2$ connected in series with Mg is opened and current stops flowing through Mg. When the release lever is further pushed down, the pin 103a of the three armed lever 103 lies on the rising part 113a of the stop lever 113 whose position has been decided by the pin 114a of the lever 114 whose position has in turn been decided by the informations of GNO, ASA, distance and so on.

Consequently the quantity of rotation of the aperture ring 102 is determined by the distance information and so on in such a manner that the aperture suited for flash photography is set. When carrying out the above mentioned operations, the rising part 103b of the three armed lever lies close to the optical axis of lens as shown in the dotted line and therefore does not strike at the uneven part 101a of the aperture setting ring. Hence, the aperture is set according to the distance information and so on quite independent of the set value. In case of the embodiment shown in the drawing the guide number setting ring is set at the position for the flashlight device exclusive for the camera, namely, at the position CAT, while in case another flashlight device is used, it is sufficient to set the guide number setting ring at a certain determined GNO scale like the embodiment shown in FIGS. 1 to 3. When further the release lever 110 is returned the aperture ring 102 is also returned anticlockwise in such a manner that the arm at the side 103b of the three armed lever 103 comes to lie on the fixed pin 107 and rotates clockwise so that 103c comes into engagement with 104a and the original state is established.

Figure 7:
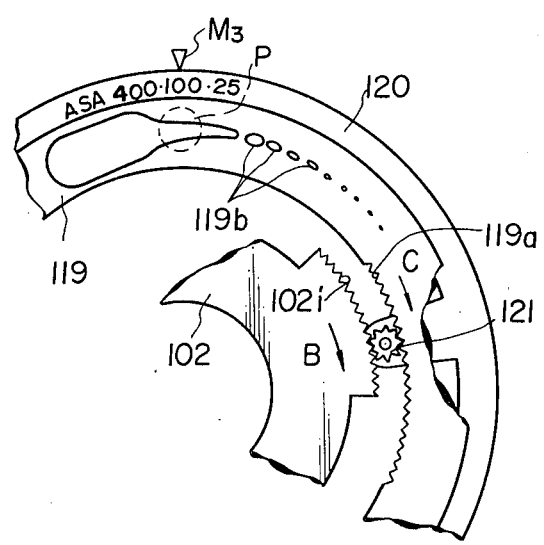
FIG. 7 shows another important part of the device shown in FIG. 5.
Figure 8:
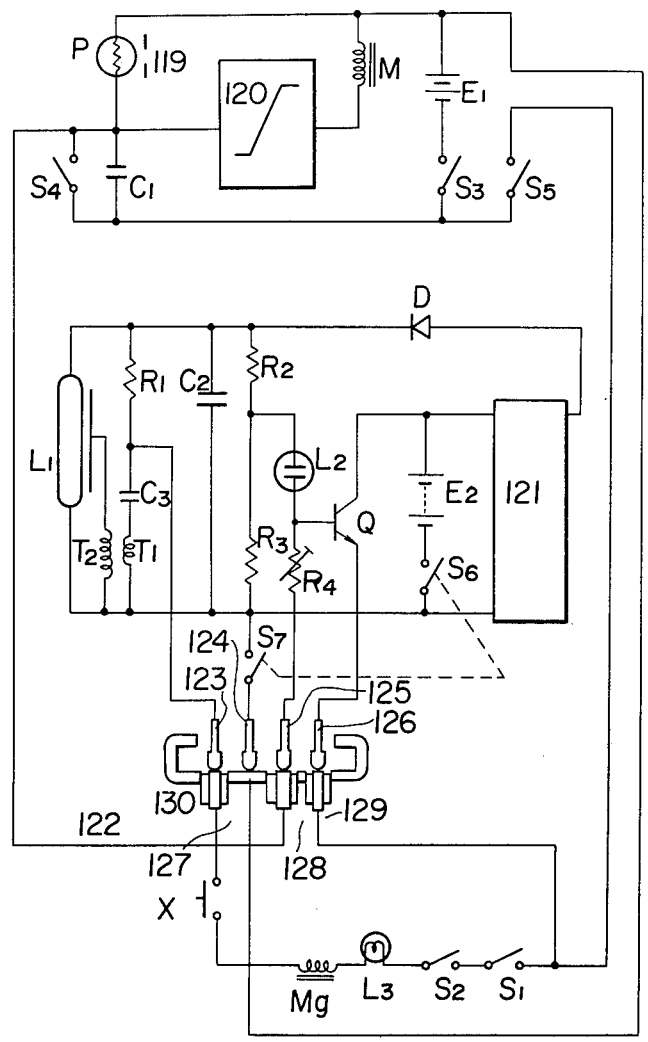
FIG. 8 shows the electric circuit diagram of the camera shown in FIG. 5.

In case of photographing under flashlight at times the aperture goes beyond the range of aperture adjustment according to the combination of the guide number, the distance and so on. Of course a proper counter measure to avoid the eventual damage of the aperture is provided, which is explained below according to FIG. 6 in which a part of FIG. 5 is shown enlarged. The drawing shows the relation between the cam part 113b of the stop lever 113 and the pin 114a of the lever 114. In the state shown in the drawing, namely when the pin 114 and 113b, of 116 are pressed to each other, because $113b_1$ forms a part of the circle A having the rotation axis $114c$ of 114 as center, the position of the stop lever 113 namely the position of the rising part $113a$ is not influenced no matter at which position the pin $114a$ and $113b_1$ of 113 are pressed to each other, so that the aperture is set at the largest value, for example, $F = 1.7$. When on the other hand the pin $114a$ and $113b_3$ are pressed to each other, because the form of $113b_3$ corresponds to the circle A, the aperture is set at the smallest value, for example, $F = 16$. When the part $114a$ and the part $113b$ are pressed to each other, the aperture is set at a certain determined value between $F = 1.7$ and $F = 16$ according to the position of $114a$. FIG. 7 shows an embodiment of the mechanism to adjust the aperture which is provided in front of the light receiving element in order that the information of the thus set aperture of the photographing lens as well as of ASA is put in the time constant device. In the drawing $102a$ is the tooth segment provided on the aperture ring, 119 the iris plate for adjusting the quantity of the light entering into the light receiving element. 119 presents a tooth segment $119a$ and the opening $119b$. 120 is the ASA setting ring, by means of which on the fixed index $M_3$ a certain determined ASA scale is set. On this scale a pinion 121 is pivotted. P is the light receiving element. When as explained in connection with FIG. 5 the aperture 102 is rotated along the direction of the arrow B in the drawing and stopped at a certain determined aperture value, this movement is conveyed to the iris plate 119 through the pinions 121, $119a$, $102i$ and so on, whereby the iris plate is rotated along the direction of the arrow C in the drawing in such a manner that the effective opening area in front of the light receiving element P is determined. If further the ASA setting ring held by means of a click holding means not shown in the drawing, is set on another ASA scale, the effective opening area in front of the light receiving element is changed even if the aperture value remains unchanged, because the pinion 121 has been displaced. In this way the output of the light receiving element assumes a value corresponding to the brightness of the oject, ASA and the aperture value. In order to enable the photographing under daylight, whereby after having determined the aperture value a proper exposure according to the brightness of the object and so on is obtained so as to photograph the principal object and the background with flashlight device under daylight, an ampere meter is exited by the above mentioned light receiving element and the current source, and the speed of the mechanical shutter is controlled according to the scale angle of the ampere meter, whereby an electronic shutter presenting a time constant circuit can also be applied.

Figure 9:
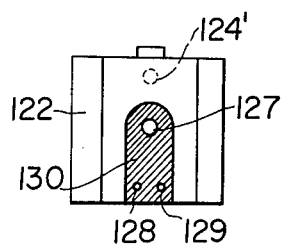
FIG. 9 shows the accessary shoe for the camera shown in FIG. 5.

Below according to the FIG. 9 are explained such an electronic shutter, the circuit for the exclusive flashlight device, the electrical connection of the flashlight device with the camera, the driving method of the magnet and so on. In the drawing, $S_1$ and $S_2$ are the switches already explained according to FIG. 5. $S_3$ is the main switch of the circuit for the electronic shutter, $S_4$ the switch for starting counting. $S_5$ is the switch which is to be closed when another device than the exclusive flashlight device is used, while $S_6$ and $S_7$ are the switches which are to be closed by operating the button in the flashlight device when the exclusive flashlight device is used. $C_1$ is the condenser for counting in the circuit for the electronic shutter, $C_2$ the main condenser for the flashlight device, and $C_3$ is the condenser for the trigger. $L_1$ is a discharging tube, $L_2$ a neon tube and $L_3$ a lamp which light up only when the flashlight device is ready for operation. Mg is the magnet already explained according to FIG. 5 and M the magnet for controlling the time for the electronic shutter. $T_1$ and $T_2$ are the coils composing a transformer for the trigger circuit. $E_1$ and $E_2$ are respectively the current source for the electronic shutter and the flashlight device. D is a diode, Q a transistor, and X the contact for the synchronized flashlight. 119 and P are respectively the iris plate and the light receiving element as already explained according to FIG. 8. 120 is the circuit for the Schmidt trigger, 121 a voltage step up circuit and 122 an accessary shoe to combine the flashlight device and the camera when they are composed separately. 123, 124, 125 and 126 are the terminals of the flashlight device which are connected respectively with the terminal 127 on the camera, the accessary shoe 122 and terminals 128 and 129. 130 is an insulation means consisting of an insulating material. Below the operation to photograph by means of the flashlight device under daylight is explained. When the flashlight device is mounted on the accessary shoe 122 and the switches $S_6$ and $S_7$ are closed, the main condensor $C_2$ and the trigger condenser $C_3$ start to be charged by means of the current source $E_1$, the voltage step up circuit 121 and so on. When $C_2$ is fully charged, the neon tube $L_2$ light up. When the release lever 110 shown in FIG. 5 is pushed down, the switch $S_1$ is at first closed. In this state a sufficient current is supplied to the magnet Mg and the lamp $L_3$ through the transistor Q from the current source $E_2$, whereby the magnet Mg pulls the iron piece shown in FIG. 5 in such a manner that the lamp $L_3$ lights up and tells that the flashlight device is ready for operation. When the release lever is further pushed down, the aperture setting device is automatically switched over to the state for photographing under flashlight due to the fact that a current flows through the magnet Mg in such a manner that the aperture is set at a proper value corresponding to the distance and so on. The switch $S_2$ is opened at a proper moment as mentioned above. When the release lever is pushed down after the aperture has been set, the shutter is released in such a manner that the shutter blade is opened. When in synchronization of the shutter release the contact for synchronization is closed, the condensor $C_3$ in the trigger circuit discharges rapidly through $T_1$, $S_7$, 124, 122, X, 127, 123 and so on in such a manner that in $T_2$ a high voltage is produced and the discharge tube $L_3$ issues a flashlight. In the light receiving element P in the electronic shutter the informations about the brightness of the object, ASA due to the iris plate 119 and aperture value are put in, whereby when the switch $S_4$ is opened in synchronization of the release of the shutter, the condenser $C_1$ starts to be charged by means of the current source and after a certain determined time the voltage of the condensor $C_1$ reaches the trigger level of the Schmidt trigger circuit 120 in such a manner that the magnet M is put in operation and the shutter is closed. Hereby with the condenser $C_1$, the circuit of the flashlight device is also connected and when the neon tube $L_2$ lights up the condensor $C_1$ is charged also from the flashlight device. If the resistance $R_4$ and so on are set in such a manner that the magnet might be put in operation for example at 1/30 second even when the object is so dark that the resistance value of the light receiving element P is almost infinite, the exposure time can be set almost independently by means of the output of the light receiving element P when the object is bright, whereby it is remarkably convenient that exposure time is set at 1/30 second, which is the limit to avoid the influence of the hand vibration when the object is dark. The above explanation relates to the operation when the flashlight device is ready for operation, while in case the flashlight device is not yet ready for operation the electronic shutter operates correctly in such a manner that a proper exposure can be obtained for photographing under daylight. In case when the main condensor is not yet sufficiently charged even if the flashlight is mounted on the camera and the switches $S_6$ and $S_7$ are closed, the neon tube $L_2$ does not light up so that no current flows through the magnet Mg and $L_3$. When the release is operated without confirming by means of either the neon tube $L_2$ or the lamp $L_3$ whether the photographing under flashlight is possible or not, because no current flows through the magnet Mg, the aperture is set at the value set on the aperture setting ring and further the shutter operates correctly in accordance with the brightness of the object, the aperture value and so on. Because at this time the neon tube $L_2$ does not light up, substantially the circuit for the electronic shutter is not connected with the circuit of the flashlight device through terminals and a long time exposure can also be obtained correctly. Further when the condensor is not charged sufficiently, the flashlight device does not operate even if the microcontact X is closed. Even if the flashlight device is mounted on the camera when the switches $S_6$ and $S_7$ of the flashlight device are opened, the photographing under daylight is carried out correctly as is the case mentioned above. At this time the neon tube $L_2$ does not light up, so that no current flows through the magnet Mg and the trigger circuit does not operate. The same thing takes place when the switches $S_6$ and $S_7$ are opened after the condensor of the flashlight device has been charged. Even when thus composed camera is used in combination with other flashlight device than that exclusive for the camera, the photographing under daylight can also be carried out as mentioned below.

When the guide number setting ring 111 shown in FIG. 5 is set at other place than CAT, namely, at a place which corresponds to the guide number of the device, the switch $S_2$ (not shown in FIG. 5) is closed in connection with the device in such a manner that in case of the ordinary flashlight device with only the terminals 123 and 124 but without the terminals 125 and 126 the safety device to prevent the operation when the charge is insufficient does not work and the means to limit the longest exposure time within a time in which the camera can be held by hand does not work, while on the other hand the photographing with flashlight device can be carried out under daylight. The reason is that in case the flashlight device exclusive for the camera is used, the magnet Mg is excited by means of the terminals 124 and 126 only when the flashlight device is ready for operation, while in the above mentioned case the magnet Mg is excited by means of the switches $S_3$, $S_5$ and so on no matter whether the flashlight device is ready for operation. Hereby when it is forgotten to displace the guide number setting ring from the position of CAT the switch $S_5$ is not closed and the lamp $L_3$ does not light so that it can be known that the guide number setting is forgotten. Generally speaking the flashlight device whose circuit is composed as shown in FIG. 9 can be used in combination with the camera with the ordinary hot shoe, in case each particle is arranged as shown in FIG. 9. FIG. 9 shows the arrangement of each particle on the side of the camera according to the present invention. As shown in the drawing the particle 127 for the contact 30 for cynchronization is arranged in the center, while the particles 128 and 129 are arranged behind the particle 127. The particles 123, 125, 126 at the side of the flashlight device are arranged in such a manner that they are connected respectively with the particles 127, 128 and 129. It is sufficient that the particle 124 for earthing is arranged in such a manner that it comes into contact with the accessary shoes 122 at the position 124 as shown in a dotted line in the drawing. The particles 127, 128 and 129 are insulated by the insulation member 130 from each other and also from 122. In case the particles are arranged as mentioned above, the direct contacts of the ordinary camera, namely, the accessary shoe or the hot shoe, are those shown in FIG. 9 from which the terminals 128 and 129 are exempled so that even if the exclusive flashlight device is attached on the shoe the terminals 125 and 126 are kept entirely away from the earth in such a manner that the flashlight device can be used smoothly.

As mentioned above according to the present invention it is possible to set aperture values suitable for the photographing under flashlight as well as the photographing under daylight only by composing the aperture setting ring and the aperture ring separately from each other and by turning the aperture setting ring from the range for the photographing under daylight as the first position to the range for the photographing under flashlight as the second position, whereby it is no more necessary to calculate the aperture value and the photographing under flashlight has become considerably easy to that the present invention can be said very profitable.

What is claimed is:

1. An exposure control system for a diaphragm priority automatic exposure camera arrangement having a shutter, comprising;

flash illuminating means;

storing means for storing electrical energy and exhibiting a voltage;

discharge means coupled to said illuminating means and said storing means for discharging the electrical energy of said electrical energy storing means through said flash illumination means to produce a flash;

sensing means connected to said storing means for detecting the voltage and for producing a signal when the voltage is sufficient to fire said illuminating means;

diaphragm means for defining an aperture size in said camera;

diaphragm adjusting means operatively connected to said diaphragm means for adjusting said diaphragm means to a first aperture size suitable for taking photographs with said flash illuminating means and a second aperture size suitable for daylight photography;

shutter adjusting means operatively connected to the shutter of the camera for adjusting said shutter to a first exposure interval suitable for taking flash photographs with said flash illuminating means and a second interval suitable for daylight photography, the exposure interval suitable for daylight photography depending at least on a predetermined aperture size suitable for daylight photography; and automatic switchcover means responsive to an output signal of said detecting means and coupled with said shutter adjusting means for automatically changing said shutter adjusting means to said first interval in response to the signal of said sensing means, said automatic switchover means being coupled with said diaphragm adjusting means for automatically changing said diaphragm adjusting means to the first size in response to the signal of said sensing means, so that the shutter is adjusted to the setting providing said flash exposure interval and the diaphragm means is adjusted to the setting providing said flash aperture size.

2. An exposure control system according to claim 1, wherein said shutter adjusting means includes:
  time constant means electrically connected to said automatic switchover means for selectively forming a time constant output dependent upon the level of brightness of said photographic subject and a time constant output corresponding to the exposure interval suited for use in the flash mode;
  electronic switching means responsive to the output of said time constant means and responsive to attainment of the output of said time constant means of a threshold level; and
  electromagnetic means electrically connected to said switching means and operatively coupled with the shutter for controlling the closing operation thereof.

3. An exposure control system according to claim 2, wherein:
  said time constant means includes;
  capacitance means;
  photosensitive means connected to said capacitance means and having a resistance value dependent upon the level of brightness of the photographic subject; and
  resistance means arranged to be selectively connectable to said capacitance means in response to the signal from said sensing means and having a resistance value corresponding to the exposure interval suited for flash operation; and
  said switchover means includes;
  switch means electrically connected between said resistance means and said detecting means for enabling the resistance means in response to the signal from said sensing means.

4. An exposure control system according to claim 1, wherein said diaphragm adjusting means includes:
  first setting means for setting the aperture size suited for daylight photography;
  second setting means for setting the aperture size suited for flash operation;
  position detecting means coupled selectively to said first setting means and said second setting means in response to said automatic switching means to selectively detect the output of said first setting means and said second setting means; and
  diaphragm actuating means associated with said position detecing means for adjusting said diaphragm means to the output from said position detecting means.

5. An exposure control system according to claim 4, wherein said second setting means includes a member for producing a distance information corresponding to a distance between the photographic object and camera.

* * * * *